United States Patent Office 2,913,911
Patented Nov. 24, 1959

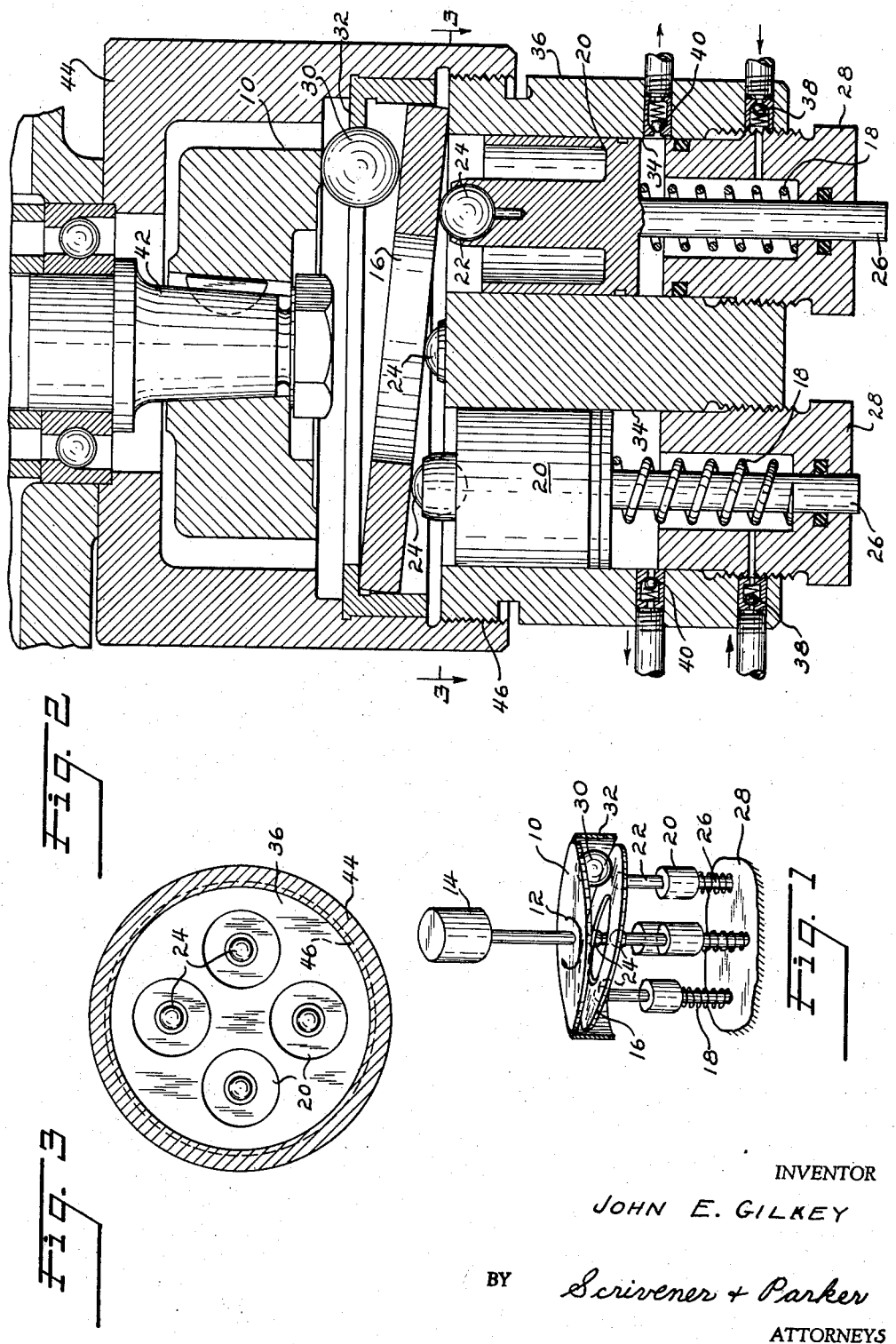

2,913,911

MOTION TRANSLATING DEVICE

John E. Gilkey, Elyria, Ohio, assignor to Bendix-Westinghouse Automotive Air Brake Company, Elyria, Ohio, a corporation of Delaware Application January 9, 1958, Serial No. 708,025

1 Claim. (Cl. 74—60)

This invention relates to mechanisms and more particularly to novel means for translating rotary motion to linear or reciprocatory motion.

A principal object of the present invention is to provide a novel mechanism for translating rotary motion to linear motion.

A still further object of the invention is to provide rotary-to-linear motion translating mechanism which includes in part a non-rotary nutating plate.

A more specific object of the invention is to provide a rotary-to-linear motion translating mechanism including a nutating wobble plate which is actuated in response to the planar rotation of a power operated driving plate through the medium of an unconfined rollable member such as a ball or other appropriate solid of revolution, either guided or unguided, which mutually engages opposed faces of the driving and nutating plates.

Yet another object of the invention is to effect not only nutation of the wobble plate by the use of said unconfined ball but also a direct speed reduction between the driving plate and the frequency of nutation of the wobble plate and any devices actuated thereby.

A still further object of the invention is to provide mechanism as set forth in the foregoing paragraphs which may be utilized with effectiveness to drive reciprocating members such as, for example, compressor pistons, pump piston and like devices.

Other objects and their attendant advantages will become apparent as the following description is read in conjunction with the accompanying drawings wherein:

Fig. 1 is a schematic diagram illustrating the principles of the invention;

Fig. 2 is a vertical cross-section illustrating the invention applied to a compressor; and Fig. 3 is a horizontal cross-sectional view on a reduced scale, taken substantially on the line 3—3 of Fig. 1.

The present invention comprises a novel mechanism for translating rotary motion to linear or reciprocatory motion and depends for its operation on a rollable member such as a ball frictionally engaged between the face of a rotary driving disc and a driven nutating or wobble plate. The driving disc provides a planar friction surface which rolls the ball on the surface of the nutating plate which is resiliently urged in the direction of the driving disc and is thus tilted by the ball in the expected manner. As the ball is rolled about the nutating plate it imparts thereto a wobble action which may be utilized to drive reciprocatory elements as, for example, compressor or pump pistons or the like. It should be especially noted and in accordance with one of the principal features of the invention, as the ball member is rolled by the action of the driving plate its speed of translation in the direction of movement of the rotating plate is not more than one-half the speed of the plate and may be somewhat less depending on the angle of tilt of the nutating plate. Thus it will be seen that a reciprocating element attached to the nutating plate will be driven through one cycle for every two revolutions of the driving plate resulting in a substantially two-to-one speed reduction between driving and driven members without the interposition of any extra speed reducing gearing. It should be apparent that in order to maintain the ball in its orbital path, an annular race is required for engaging the outer edge of the ball to retain it interposed between the two plates.

Referring now to Fig. 1 of the drawing, the driving plate is designated by the numeral 10 and this may be driven at a constant speed in the direction of the arrow 12 by a source of rotating motion designated by the numeral 14. A nutating plate 16 is resiliently urged in the direction of the driving plate 10 through the action of springs 18 bearing on pistons 20 which are provided at their upper ends with actuating rods 22 having an antifriction connection with the underside of the nutating plate. This connection may comprise any of a variety of devices and in the drawing they are shown as comprising spherical knob-like members 24 which permit unlimited relative rocking movement on the knobs of those portions of the nutating plate engaged by said knobs. The lower ends of the pistons 20 may be provided with guide rods 26 operating through apertures in a lower plate member 28.

Interposed between the lower face of the driving plate 10 and the upper face of the nutating plate 16 is a spherical element such as the ball 30 which causes the nutating plate to tilt against the pressure of springs 18 as before mentioned. An annular race 32 prevents the ball from being squeezed out between the plates 10 and 16 and serves to guide the ball in its annular or orbital path of movement about the plate axes. The race 32 may be fixed or it may, if desired, comprise the inner race of a conventional ball bearing assembly or the race may be fixed to the rotating plate 10.

When the plate 10 is driven in the direction of the arrow 12 by motor 14, the ball 30 is caused to roll on the upper surface of the nutating plate 16 and as it proceeds in its annular path on the nutating plate it imparts a wobble thereto causing the pistons 20 to be moved downwardly in succession against their springs 18 as the ball is moved over the rods 22, each piston returning to its fully raised position when the ball has moved to a position diametrically opposite the piston. Since the ball is being rolled on a substantially fixed surface by a movable surface acting on the opposite side of the ball, it will be understood by those skilled in the art that the ball moves in its orbit at a speed which cannot exceed one-half the speed of the rotating driving plate 10 and is analogous in its action to that of a planetary gear. Thus the pistons are reciprocated at a frequency which cannot exceed half the speed of the driving motor 14 so that a speed reduction is effected between the motor 14 and the pistons 20 without the interposition of any extra speed reducing gearing.

Referring now to Fig. 2, the principles of the invention illustrated in Fig. 1 are shown in their practical application to an air compressor. Elements in Fig. 2 corresponding to the elements in Fig. 1 receive the same reference numerals with the compressor comprising a plurality of pistons 20 which may be reciprocated in compressor cylinders 34 in a block 36 against the pressure of return springs 18 to draw air into the cylinders through inlet check valves 38 on the upstroke of the pistons and force compressed air out of the cylinders through outlet check valves 40 on piston downstroke.

The pistons are reciprocated through the action of the nutating plate 16 which is actuated by the ball 30 whose upper side is engaged by a driving member 10 keyed to a shaft 42 driven by an external power source such as an electric motor. The driving member 10 rotates in a stationary housing 44 which may be internally shouldered to receive a race member 32 which is identical in function to the corresponding member described in Fig. 1. The lower end of the housing member 44 is threaded at 46 to receive the block member 36 containing the pistons 20 which engage the lower surface of the nutating plate 16 through the medium of spherical bearing members 24 which are clamped in position atop actuating rods 22 integral with the pistons 20. The lower end of the pistons may be provided with guide rods 26 as previously described for Fig. 1. As illustrated in Fig. 3, four pistons may be provided symmetrically arranged about the axis of the block 36 and through this number can be varied, it is desirable that the pistons or other driven members be symmetrically arranged about the respective axes of rotation and nutation.

It is believed that the operation of the compressor of Fig. 2 should be obvious from the foregoing description of Fig. 1. The invention has been illustrated in its application to the driving of reciprocatory pistons. The invention should not be understood to be limited to such use since it should be apparent that the invention has application to any use where it is desired to translate rotary motion to linear motion with a simultaneous speed reduction between the driving and driven members. The invention therefore is susceptible of various modifications and changes without, however, departing from the scope and spirit of the appended claim.

What is claimed is:

Mechanism for translating rotary motion to reciprocatory motion comprising a rotatable driving disc and a nutatable driven disc in face-to-face relationship with said driving disc, resilient means urging said driven disc towards said driving disc, a spherical element intermediate said discs and laterally spaced with respect to the axes thereof so as to impart a tilt to said driven disc with respect to said driving disc, said spherical element being in tangential frictional engagement with said driving disc and freely rollable on the surface of said driven disc, an annular race concentric with said driving disc and engageable by said spherical element to retain the latter between said discs, and linearly movable elements operatively connected to said driven disc to be moved thereby as said disc is nutated at a speed not greater than one-half the speed of rotation of said driving disc by movement of said spherical element as it is rolled over the surface of said driven disc by rotation of said driving disc.

References Cited in the file of this patent
UNITED STATES PATENTS

| | | |
|---|---|---|
| 1,746,335 | Boyce | Feb. 11, 1930 |
| 1,803,834 | Bates | May 5, 1931 |
| 2,402,244 | Elberty | June 18, 1946 |
| 2,512,717 | Dicke | June 27, 1950 |